(12) United States Patent
Bonningue et al.

(10) Patent No.: US 6,241,129 B1
(45) Date of Patent: *Jun. 5, 2001

(54) DOSING HEAD

(75) Inventors: Philippe Bonningue, Paris; Jean-Louis Bougamont, Eu, both of (FR)

(73) Assignee: L'Oreal, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,411

(22) Filed: Apr. 21, 1999

(30) Foreign Application Priority Data

Apr. 21, 1998 (FR) .................................... 98 04973

(51) Int. Cl.$^7$ ...................................................... G01F 11/00
(52) U.S. Cl. ........................................... 222/213; 222/207
(58) Field of Search .................................. 222/449, 453, 222/476, 492, 496, 514, 207, 213

(56) References Cited

U.S. PATENT DOCUMENTS

| 416,435 | * | 12/1889 | Benner | 222/213 |
| 2,904,227 | * | 9/1959 | Graham | 222/207 |
| 3,567,079 | * | 3/1971 | Weigand | 222/213 |
| 5,090,600 | | 2/1992 | Clark . | |

FOREIGN PATENT DOCUMENTS

| 674613 | 1/1930 | (FR) . |
| 2 203 752 | 5/1974 | (FR) . |
| 2-90256 | 7/1990 | (JP) . |
| 2-111641 | 9/1990 | (JP) . |
| 2-111643 | 9/1990 | (JP) . |
| 3-15370 | 2/1991 | (JP) . |
| 3-64240 | 6/1991 | (JP) . |
| 10-72049 | 3/1998 | (JP) . |
| 10-72051 | 3/1998 | (JP) . |
| WO 92/10727 | 6/1992 | (WO) . |

* cited by examiner

*Primary Examiner*—Philippe Derakshani
*Assistant Examiner*—Thach H Bui
(74) *Attorney, Agent, or Firm*—Oblon, Spivak, McClelland, Maier & Neustadt, P.C.

(57) ABSTRACT

A dosing head (1) includes a dosing chamber (30), of axis X, inside which a piston (21) is slidably fitted, a first surface (31) of which is in communication with the interior of a container and a second surface (25) of which is in communication with the dosing chamber (30). The piston (21) is fitted so as to be able to pass from a first position in which the dosing chamber (30) has a maximum volume to a second position in which the dosing chamber has a minimum volume. The dosing chamber (30) includes at least one inlet (12, 13) which is open when the piston (21) is in the first position and is closed when the piston (21) is in the second position. The piston (21) is coupled to a closure member (40) forming at least one passage (27, 28, 100–110) between the said closure member (40) and an outlet (20) for allowing a dose of the product to be expelled.

22 Claims, 5 Drawing Sheets

DOSING HEAD

BACKGROUND OF THE INVENTION

1. Field of the Invention

The present invention relates to a dosing head for dispensing a fluid product in the form of doses of predetermined volume, and in particular, a cosmetic product such as a shampoo, a conditioner, a gel, a lotion, a milk, etc. The invention also relates to a packaging and dispensing assembly equipped with a dosing head according to the present invention.

2. Discussion of the Background

In the cosmetics field in particular, a good number of hair products, particularly shampoos, are packaged in containers having deformable walls, the neck of which is closed off by a wall pierced at its center by one or more small holes for expulsion of the product. In order to dispense the product, the container is turned upside down. Pressure exerted on the deformable walls of the container allows the product to be forced out through the hole or holes. The product is collected in the user's palm and applied to his or her hair. However, this simple operation does not allow the amount of product dispensed to be dosed.

Of course, there are devices for dosing a product to be dispensed, but these have a complexity such that their cost is inconsistent with the economic requirements of certain distribution channels, in particular the mass market.

U.S. Pat. No. 5,090,600 describes a dosing head having a dosing chamber formed inside a piston, a free end of which is provided with openings capable of allowing dosed expulsion of the product. The openings in the dosing chamber are exposed by means of pressure exerted by the product on one face of the piston. The product then flows under gravity, through the exposed openings. Such a head is particularly appropriate for the dosed dispensing of low viscosity or "very liquid" products, such as drinks. On the other hand, such a system cannot easily be used for dispensing more viscous products, such as those normally used in the cosmetics field. This is because the viscosity of these products does not allow the dose of product to flow sufficiently under the effect of merely its own weight. Furthermore, the openings are formed from holes which are pierced in the wall of the dosing chamber, and which are therefore oriented radially with respect to the section of the said dosing chamber. Thus, when being expelled, the product leaves with an essentially radial component, which may be acceptable when the product flows merely under the effect of its own weight. On the other hand, such a radial expulsion is completely unacceptable when the product is expelled under pressure, insofar as it becomes very difficult to collect the dispensed product in a localized manner.

U.S. Pat. No. 2,904,227 describes a head for the dosed dispensing of a product, comprising a dosing chamber inside which a piston is slidably fitted. An axial channel passes through the piston and terminates near the free end of the piston in a radial portion which emerges in an outlet. In the rest position, the outlet is closed off. In order to dispense a dose of the product, the outlet is exposed due to the pressure of the product being exerted on the piston. The product flows through a radial portion of the channel, into the axial part of the channel and leaves through the radial outlet. In the same way as in the case of the device in the previous document, the product leaves with a very high radial component, which therefore does not allow localized dispensing of the product. Particularly in the case of a cosmetic product, it is difficult to collect the dispensed product in one's palm. Furthermore, since the product necessarily passes through this axial channel made inside the piston, the device is particularly unsuitable for high flow rates, particularly in the case of products having a high viscosity. In addition, such an axial channel is subject to fouling, particularly when the product has not been used for a long period of time, possibly making the device completely unusable.

Patent Application WO 92/10727 describes a dosing head comprising a fixed-volume dosing chamber which can be moved from a filling position to a dispensing position, in which one or more outlets are exposed so as to allow the product to flow out under gravity. Such a system is not suitable for dispensing high-viscosity products.

Patent FR 674,613 describes a dispensing head which does not allow the quantity of dispensed product to be dosed.

SUMMARY OF THE INVENTION

One of the objects of the invention is to provide a dosing head which solves, completely or partly, the problems discussed with reference to the devices of the prior art.

One object of the invention is to provide a dosing head which is easy to use and has a low manufacturing cost.

Another object of the invention is to provide a dosing head which is particularly suitable for the dosed dispensing of high-viscosity products.

Another object of the invention is to provide a dosing head allowing dosed and localized dispensing of a pressurized product.

According to the invention, these objects are achieved by producing a dosing head intended to be mounted on a container containing a product. The dosing head includes a dosing chamber with a longitudinal axis, inside which a piston is slidably fitted, a first surface of which piston is in communication with the interior of the container and a second surface, opposite the first, in communication with the dosing chamber. The piston is fitted so as to be able, in response to pressure exerted by the product on the first surface, to move from a first position in which the dosing chamber has a maximum volume to a second position in which the dosing chamber has a minimum volume. The dosing chamber includes at least one inlet which is open when the piston is in the first position and closed when the piston is in the second position. The piston is coupled to a closure member which, when the piston moves from the first position to the second position, emerges substantially through an opening made in a wall of the dosing chamber located opposite the piston, and forms at least one passage between the closure member and an edge of the wall defining the opening. The opening is sealed off by the closure member when the piston is in the first position.

With such a structure, in which the product leaves via one or more passages formed on the outside of the closure member, i.e. between the closure member and the inner edge of a hole in which the closure member moves, it is possible to expel the product as at least one flow having an essentially axial component, i.e. in a highly localized manner, and therefore in a way such that the product can be easily collected, especially in one's palm.

Unlike certain devices of the prior art, which use a dosing chamber with a fixed volume, the device according to the invention uses a chamber with a volume which varies in response to the movement of the piston inside the chamber under the pressure of the product. Thus, the product contained in the dosing chamber is expelled by the piston under the pressure of the product, thereby allowing high-viscosity products to be dispensed.

The piston attached to the closure member, may be coupled to the closure member in various ways. It may involve a fixed link (in the case of a piston which forms a single piece with the closure member or is fixably fitted onto the closure member). In this case, the piston moves in the same way as the closure member, i.e. in a movement with the same amplitude. Alternatively, it may involve a sliding link which, especially in combination with suitable stops, allows the piston to move integrally with the closure member over a part of its travel, and then independently of the closure member over the rest of its travel. It is thus possible to limit the travel of the closure member, and especially the part which emerges from the latter, while still maintaining the possibility of dispensing large volumes of product.

Furthermore, by placing the outlet passage or passages between the closure member and the opening in the wall of the dosing chamber, it is possible to a large extent, by modifying the number of passages and their size, to vary the output flow rates of the product. In the case of a cylindrical axisymmetric closure member, it is possible to define one or more product flow passages which may extend over an angle varying from 1° to 360°. This flexibility allows the dispensing of products which have a viscosity chosen in the range from very liquid products to very viscous products, such as shampoos or gels. In addition, as mentioned above, when pressure is exerted under normal conditions of use, the product is expelled essentially along one axis, in this case, the longitudinal axis of the dosing chamber. This essentially axial expulsion of the product allows it to be easily collected, especially in one's palm, in the case of a shampoo. The manufacturing cost is compatible with the economic requirements of the mass market insofar as such a head employs a limited number of pieces, the manufacture of which, especially by molding, does not involve the use of complicated or expensive molds. Typically, for a shampoo, the volume of the dosing chamber is about 5 ml.

Advantageously, the closure member substantially closes off the opening when the piston is in the second position. Thus, the expulsion of the product is interrupted "suddenly," thereby allowing the same dose of the product to always be dispensed.

Elastic return means may be provided in order, when the product stops being pressed against the first surface of the piston, to return the piston to the first position.

Advantageously, such elastic return means consist of a helical spring placed around the closure member, a first end of which spring is in abutment with the second surface of the piston and the second end of which is in abutment with a surface of the wall lying opposite the second surface. Advantageously, the second end of the spring is in abutment over a discontinuous portion of the surface of the transverse wall, forming at least one recessed portion, so as to allow the product to flow from the dosing chamber to the outlet passages, under the spring, when the spring is entirely compressed. Draining of the dosing chamber is thus improved.

The profile of the piston may be such that, when the latter is in the second position, an annular region of the piston is substantially in contact with the surface of the wall around the spring. Thus, when the piston is in the second position, the "residual" volume between the piston and the wall in which the opening is made is reduced, the residual volume being associated with the presence of the compressed spring around the closure member.

Alternatively, it is possible to ensure that the piston is returned manually, by pressure being exerted on the free end of the closure member, or when fitting a removable cap onto the dosing head. As the piston returns to the first position, the outer surface of the closure member is scraped by the edge of the wall defining the opening. In the case of a highly viscous product, the product thus scraped may then be manually removed from the corresponding surface of the dosing head.

Preferably, the container has deformable side walls, the product being made to press against the first surface of the piston by pressure exerted on the walls and means allowing air to enter the container when the pressure on the walls ceases so as to compensate for the reduction in the volume of product inside the container after a dose of the product has been dispensed. Thus, this configuration has the advantage of allowing operation similar to the operation used conventionally, particularly in the cosmetics field, and as discussed in the first part of the description.

Preferably, the air intake, while the piston is returning to the first position, takes place via the passage or passages between the closure member and the edge of the wall defining the opening. The construction of the assembly is thereby simplified by dispensing with a separate circuit for the air intake.

According to a preferred embodiment, the inlet extends over an axial height such that, over a first part of the piston stroke between the first and second positions, the inlet (or inlets) is (or are) open, so as to allow pressurized product to enter the dosing chamber, in order to allow substantially complete filling of the dosing chamber. The closure member is configured so that the opening in the dosing chamber is closed when the piston moves over the first part of its travel. This makes it possible, in the case of a viscous product, to be able to fill substantially the entire dosing chamber, even when dispensing a viscous product shortly after a previous dispensing operation. This is because, in the case of a highly viscous product, since the product is flowing under gravity, there might not be sufficient time for it to fill the entire dosing chamber. With this advantageous characteristic of the invention, gravity filling of the dosing chamber is supplemented by pressurized filling which occurs, where appropriate, at the very start of a dispensing phase. More specifically, a plurality of such inlets are used, these being arranged uniformly around the periphery of the dosing chamber.

In the latter configuration, the closure member may include a first portion adjacent to the piston and a second portion opposite the first portion, the second portion of the closure member having approximately the same height as the axial height of the inlet (or inlets) and a cylindrical cross section capable of closing off the opening over the first part of the travel of the piston. Thus, exposure of the product outlet passage or passages occurs approximately simultaneously with closure of the inlet or inlets.

Advantageously, the passage (or passages) between the closure member and the edge of the wall defining the opening is (or are) formed by one or more axial regions of the closure member, the regions having a smaller cross section than the cross section of the opening and lying in an intermediate portion located between the first portion and the second portion. By way of example, these may be axially oriented grooves made in the outer wall of the closure member, at different points spaced uniformly around the periphery of the closure member. The number and depth of such grooves depend to a great extent on the viscosity of the product and on the desired flow rate.

Typically, the passage (or passages) has (or have) a radial width of between 0.01 mm and 8 mm, and preferably between 0.2 mm and 2 mm.

According to another embodiment, the intermediate portion has a smaller cross section than the cross section of the opening and lies along the axis of the opening so as to allow the product to pass around the closure member. The intermediate portion is preferably connected to the second portion via a frustoconical region. Such a geometry makes it possible to have a uniform flow of product around the closure member, in the manner of a tube, the axial component of which is further improved, the frustoconical part forming a ramp for the product, so as to guide its flow approximately axially.

According to a preferred embodiment, the dosing chamber lies annularly around the closure member, the closure member being centered on the longitudinal axis of the dosing chamber. Advantageously, the chamber and the closure member are of circular cross section. Although a circular cross section is preferred, any other section could however be used. In particular, the closure member could have a square, triangular, hexagonal, oval, star-shaped or other cross section. Likewise, it is possible to design the closure member so that it is not centered on the axis of the dosing chamber. The "design" of the dosing head is chosen depending on the desired aesthetic appearance. It is possible especially to design the dosing chamber so that, in the emergent position of the closure member, the closure member has substantially no portion emerging beyond an end region of the dosing chamber, formed annularly with respect to the closure member.

The dosing head according to the invention may comprise means fixing the dosing head onto a neck formed by the container, by snap-fastening or screwing. Preferably, the dosing head according to the invention is obtained by molding a thermoplastic, such as a polypropylene or polyethylene.

According to another aspect of the invention, an assembly made for the packaging and dosed dispensing of a product, such as a cosmetic product, includes a container formed from a body which has one end closed by a bottom and a neck formed at a second end. A free edge of the neck defines an opening. A dosing head according to the invention, is fixedly fitted onto the said neck. The container may be in the form of a tube or a bottle. It may have any cross section, such as oval, elliptical or circular. A cap may be provided in order to removably cover the dosing head, especially in the storage position. Advantageously, the dosing head is fitted along the axis of the container. However, this is not a necessary characteristic. In some cases it may be desirable to fit the dosing head at an angle with respect to the axis of the container, so as to improve the extent to which the container may be drained.

Advantageously, the body has side walls capable of deforming when pressure is exerted thereto, and capable of returning to their initial shape when pressure ceases. Typically, the pressure is exerted perpendicularly to the side walls.

Such an assembly is particularly suitable for the packaging and dosed dispensing of a cosmetic product, especially a shampoo, a conditioner, a hair gel, a milk or a beauty-care cream.

BRIEF DESCRIPTION OF THE DRAWINGS

Apart from the arrangements explained above, the invention consists of a number of other arrangements which will be explained below with regard to non-limiting illustrative embodiments which are described with reference to the appended figures, among which:

In FIG. 1A, the head is in the rest position. In FIG. 1B, the head is in the position for dispensing a dose;

DETAILED DESCRIPTION OF THE PREFERRED EMBODIMENTS

Figure 2:
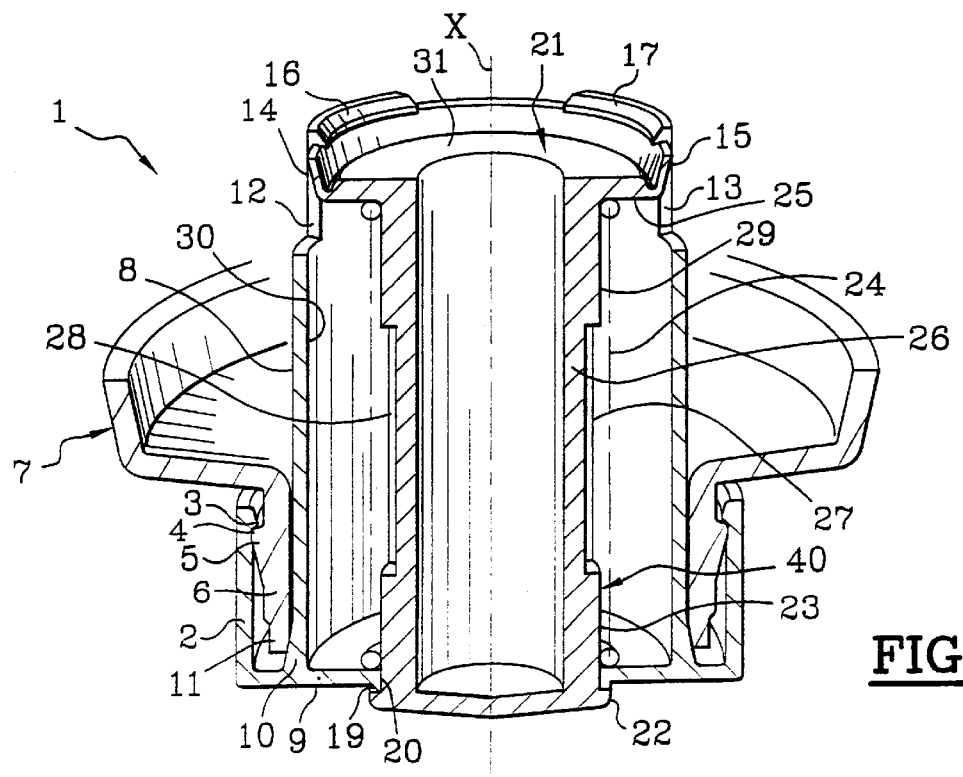
FIG. 2 represents an axial sectional view of an embodiment of the dosing head according to the invention.

The dosing head 1 shown in FIG. 2 (shown in the position with the top of the container pointing downwards) comprises a transverse wall 9 having, around its periphery, a circular catching skirt 2, a free edge 3 of which comprises, on its inner surface, a snap-fastening bead 4 which can engage with a corresponding snap-fastening bead 5 provided on the base of the neck 6 of a container 7 such as a bottle having deformable walls.

The head includes a second skirt 8, of longitudinal axis, and concentric with the catching skirt 2. Skirt 8 has a smaller external diameter than the internal diameter of the catching skirt 2. The difference in diameter corresponds approximately to the thickness of the neck 6. At the junction between the skirt 8 and the transverse wall 9, on the side facing the catching skirt 2, the skirt has a slightly frustoconical part 10 so as to, when in the position in which the dosing head is fitted onto the neck, seal off the opening defined by the free edge 11 of the neck 6. Skirt 8 forms the outer wall of the dosing chamber 30 of the dosing head 1. At its free end, opposite the transverse wall 9, the skirt 8 has a plurality of cut-outs (discussed in detail below) which form a plurality of product inlets 12, 13, in this case four inlets, arranged over the circumference of the skirt 8. Preferably, inlets 12, 13 are arranged uniformly over the entire circumference of skirt 8. Preferably, inlets 12, 13 are separated by catching and guiding tabs 14, 15 which have a degree of elasticity, radially with respect to the skirt 8, and the free end of which terminates in a bead 16, 17 facing the inside of the skirt. The beads 16, 17 are intended, as will be seen in greater detail below, to hold the piston 21 in position inside the dosing chamber 30.

Transverse wall 9 has an edge 19 bent over towards the outside of chamber 30 and defining an opening 20 of circular cross section centered on the axis X of the dosing chamber 30. A piston 21 is slidably fitted inside skirt 8, the piston 21 being extended at its center, on the transverse wall 9 side, by an axial sleeve forming a closure member 40. A face 25 of the piston 21 faces the dosing chamber, while the other face 31, is in communication with the interior of the container 7 via the open end of the skirt 8. The piston 21 is fitted by elastically splaying the catching tabs 14, 15 in order to allow the piston to pass, whereupon the tabs 14,15 spring back to their initial position once the piston is in place inside the skirt 8. According to the embodiment illustrated, the axial sleeve is open at its end adjacent to the piston 21. However, it is possible to design this inlet so that it is closed off by a plate fitted on the piston, so as to avoid the creation of any dead volume at this point. Alternatively, the closure member is solid.

In the absence of any additional pressure inside the container 7, the piston is pressed against the beads 16, 17 by means of a spring 24, one end of which bears against that face 25 of the piston 21 which lies inside the dosing chamber 30 and the other end of which bears against the internal surface of the transverse wall 9. In the high position of the piston 21 (as viewed in FIG. 2), the piston 21 defines together with the cut-outs in the skirt 8, a plurality of inlets 12, 13 for the product to enter the dosing chamber 30. The inlets 12, 13 have a maximum axial height (i.e. in the position in which the piston is in abutment) which is typically about a few millimetres. By way of example, the cut-outs have an axial height of about 10 mm.

The closure member comprises, at its end opposite the piston 21, a portion 23 having a diameter slightly less than the diameter of the opening 20 so as to allow it to slide in an approximately sealed manner inside the said opening 20. The height of this portion 23 is approximately equal to the axial height of the inlets 12, 13. At its free end, the portion 23 forms a shoulder 22 having an external diameter slightly greater than the diameter of the opening 20 and intended, in the high position of the piston 21, to come into abutment, on the outside of the dosing chamber 30, with the bent-over edge 19 which defines the opening 20. The closure member also comprises an intermediate portion 26 on the outer surface of which are arranged, in a uniform manner, a plurality of grooves 27, 28 (four grooves separated by 90°, in this example) which extend over an axial height approximately equal to half the axial height of the closure member 40. This axial height of the grooves defines the "dosing travel" of the system. Thus, when the grooves 27, 28 are opposite the opening 20, they define together with the edge 19 of the opening 20 a plurality of passages for expulsion of the product, as a plurality of flows with an essentially axial component, particularly when the pressure exerted on the walls of the container corresponds to a pressure such as that used under normal operating conditions. The radial depth of the grooves is about 1 mm. Between the intermediate portion 26 and the piston 21, there is a portion 29 of external diameter approximately equal to the external diameter of the portion 23 so as to, in the low position of the piston, substantially seal off the opening 20.

Figure 1A:
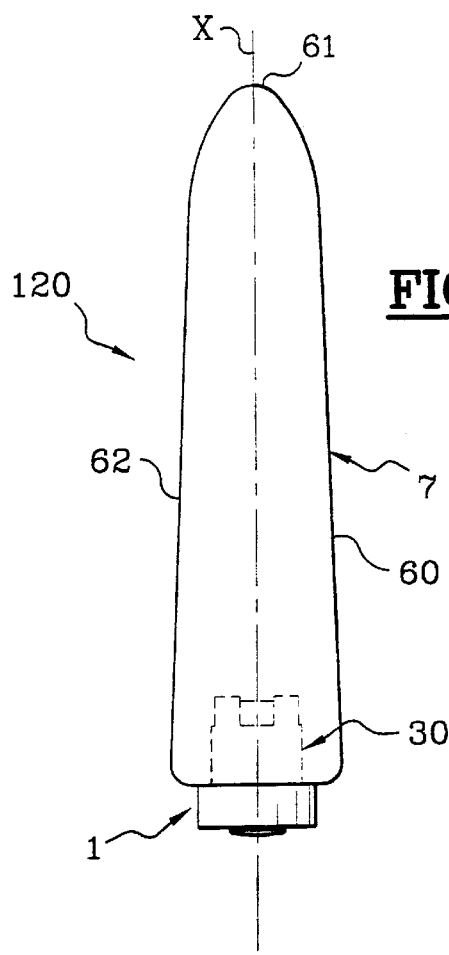
FIGS. 1A–1B represent an embodiment of a container, in the form of a bottle, fitted with a dosing head according to the invention.
Figure 1B:
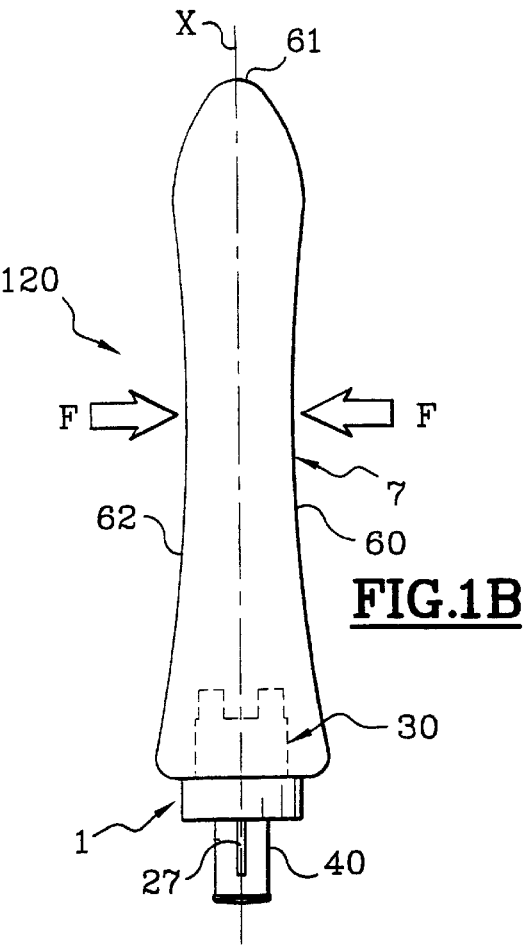

As shown in FIGS. 1A and 1B, the assembly 120 onto which the dosing head 1 is fitted consists of a bottle 7, for example, made of polyethylene or polypropylene. The bottle 7 has a body 62 closed by a bottom 61. The body has an elongate transverse cross section and is formed with walls 60 that are elastically deformable under the effect of pressure F exerted, in the manner illustrated in FIG. 1B, perpendicularly to the large sides of the bottle.

FIGS. 1A–1B, and 4A–4D to which reference will now be made, illustrate the operation of the dosing head described with reference to FIG. 2. In the rest position, (as shown in FIG. 2), the container 7 is preferably placed with its top facing downwards on a plane surface. In this position, the opening 20 is closed off by the free end 22, 23 of the closure member 40. The piston 21, stressed by the spring 24, is in abutment with the beads 16 and 17 of the catching tabs 14 and 15. The inlets 12 and 13 are exposed so that the product can flow under gravity into the dosing chamber 30, around the closure member 40, so as to fill the dosing chamber 30. This rest position is also shown in FIG. 1A.

Figure 4A:
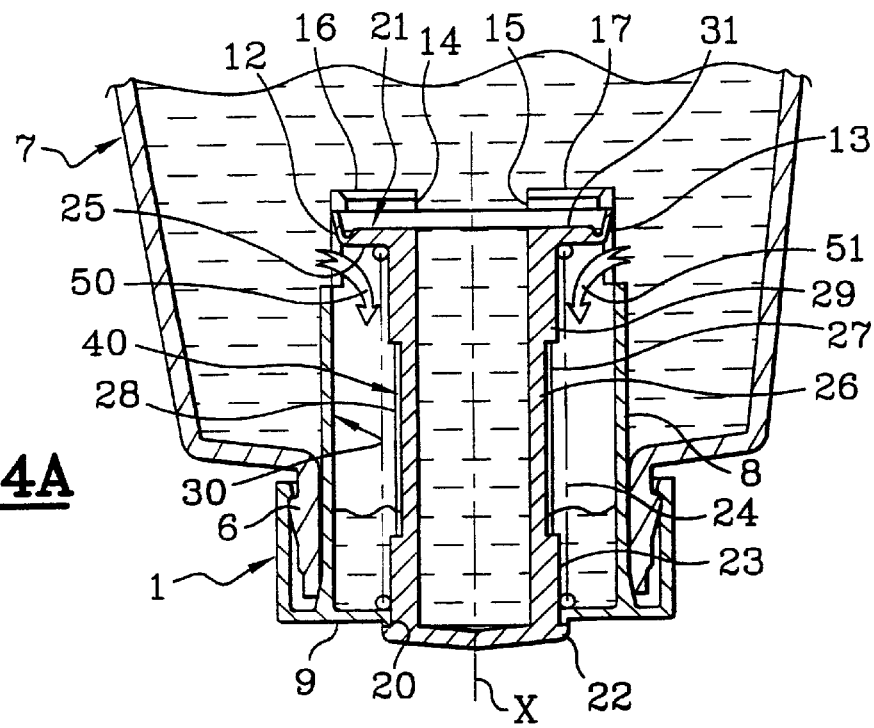
FIGS. 4A–4D are sectional view illustrating the various steps in the operation of the dispensing head in FIG. 2.
Figure 4B:
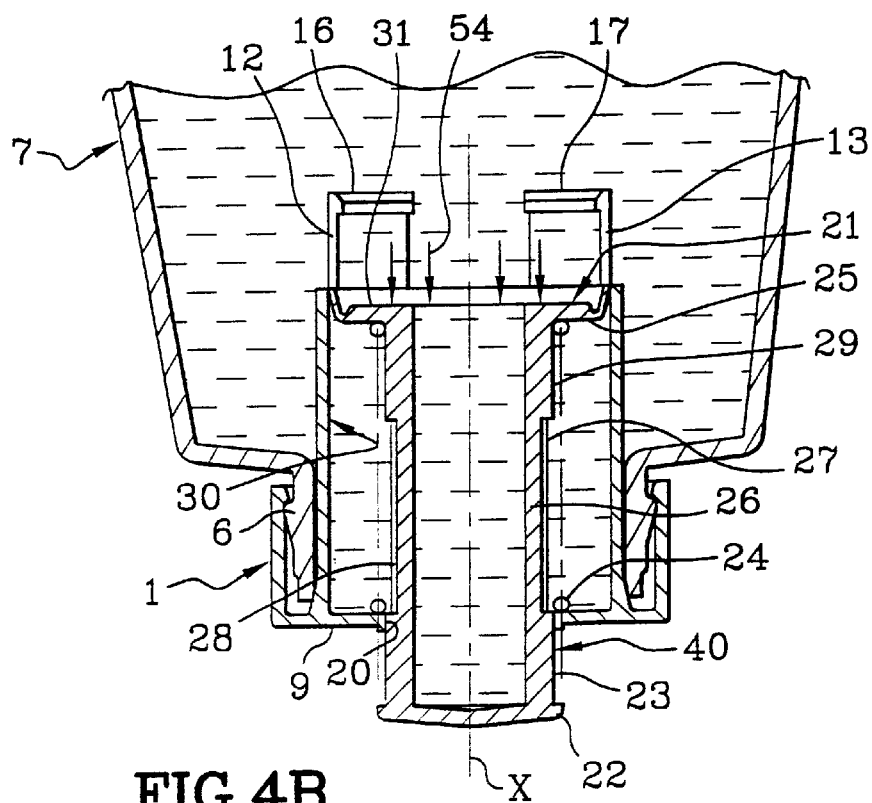

In FIG. 4A, pressure is exerted on the side walls of the container, the container 7 being held with one hand with its top facing downwards, for example. If the product has not had the time to gravity-fill the entire dosing chamber (for example between two uses very close to each other in the case of a very viscous product), the product is firstly forced in the direction of the openings 12 and 13 in the dosing chamber until the latter is completely filled. The incoming flows of the product are shown by the arrows 50 and 51. In this "communicating" position of the openings 12, 13, a balance is created between the forces which are exerted, on the one hand, on the periphery of the face 31 of the piston and, on the other hand, on the periphery of the face 25 of the piston, the piston advancing towards the transverse wall 9 of the dosing chamber only under the effect of the pressure being exerted on that central part of the face 31 which lies opposite the closure member 40. During this first part of the movement of the piston 21, the opening 20 is sealed off by the portion 23 of the closure member 40.

Figure 4C:
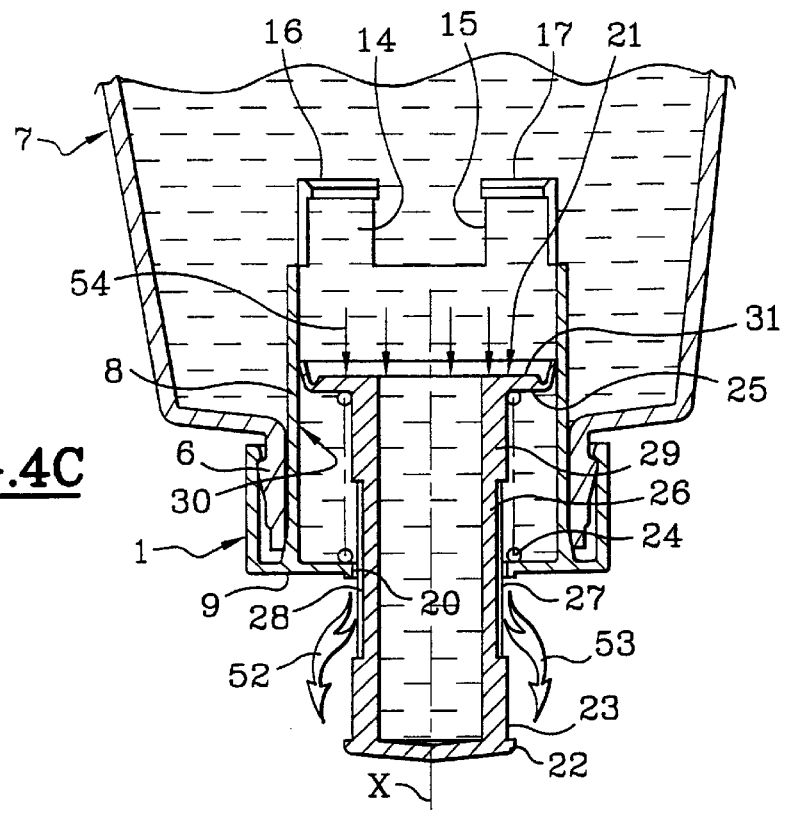
Figure 4D:
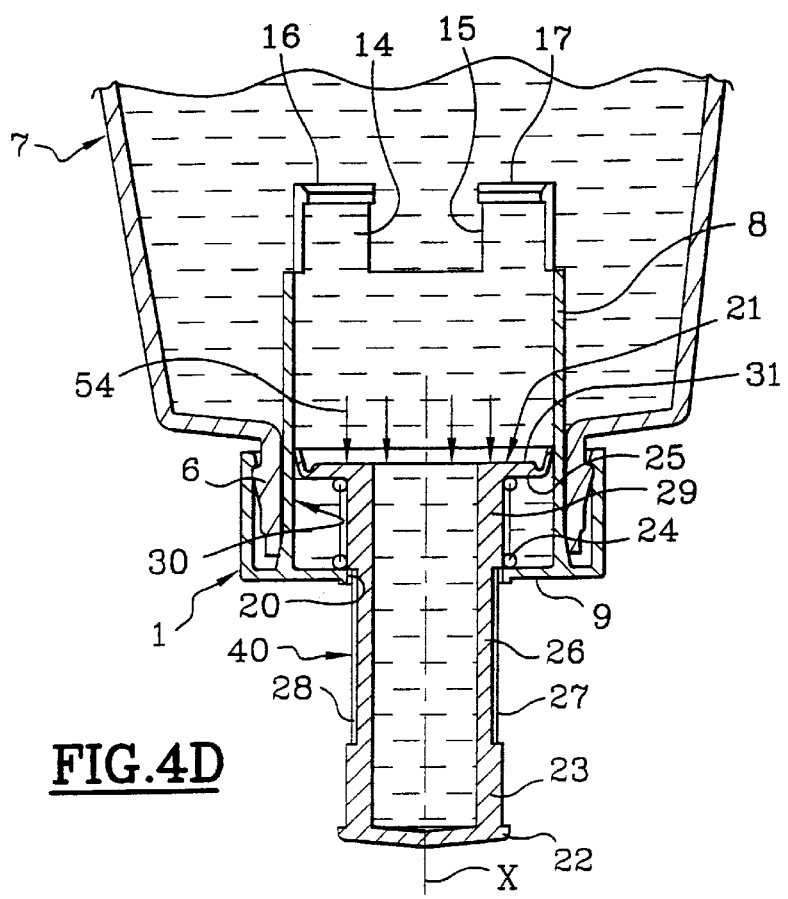

After a travel approximately equal to the axial height of the openings 12, 13 (FIG. 4B), the piston 21 interrupts the communication between the dosing chamber 8 and the container 7, the cut-outs defining the openings 12 and 13 then being on the side of face 31, which is opposite the dosing chamber 30. Substantially at the same time, the intermediate portion 26 of the closure member 40 arrives opposite the opening 20, so as to allow expulsion of the product via the passages defined by the grooves 27 and 28. In this "non-communicating" position of the openings 12, 13, the product presses on the entire face 31 of the piston 21 (arrows 54). As shown in FIG. 4C by the arrows 52, 53, the product flows between the closure member and the opening 20 as substantially axial flows along the emergent part of the closure member 40. The product therefore leaves in a localized manner, substantially along the axis of the container, and may be collected in the user's palm.

By continuing to press on the walls of the container 7, the piston 21 continues to descend towards the opening 20 until the completely compressed turns of the spring 24 form an abutment. In this position, illustrated in FIG. 4D, the closure member 40 has emerged substantially outside the dosing head 1. The portion 29 of the closure member 40 comes opposite the opening 20 and seals the latter substantially, thus interrupting, in a precise manner, the dispensing of the product, after a defined volume of the product has been dispensed. This position is also illustrated in FIG. 1B.

When the pressure exerted on the walls of the bottle is released, these walls return to their initial position. The piston, under the action of the return force of the spring 24, returns into the high position of abutment with the beads 16, 17 of the tabs 14 and 15. During this return to the high position, air is sucked into the container via the passages formed by the grooves 27 and 28 in the intermediate portion 26 of the closure member 40, so as to compensate for the loss of volume inside the container caused by the dispensing of a dose of product. It should be noted that the air intake occurs firstly by suction via the grooves 27, 28 as the piston rises under the elastic return forces of the spring 24. The air thus sucked in is then drawn into the container 7 via the openings 12, 13 when communication is re-established between the dosing chamber 30 and the container 7.

Figure 3A:
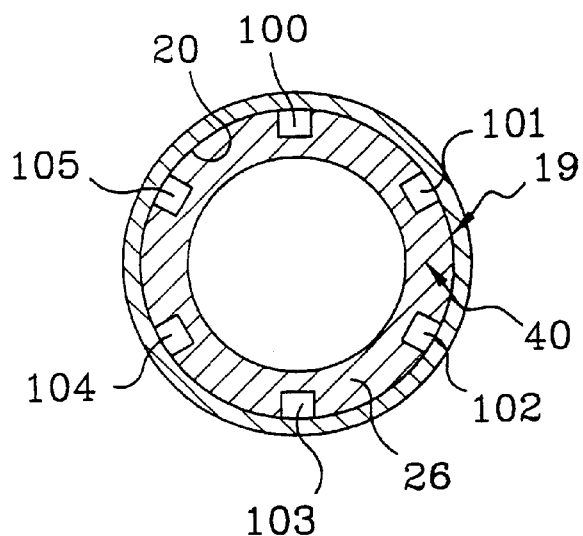
FIGS. 3A–3C represent cross sectional views illustrating various configurations of the product outlet passages.
Figure 3B:
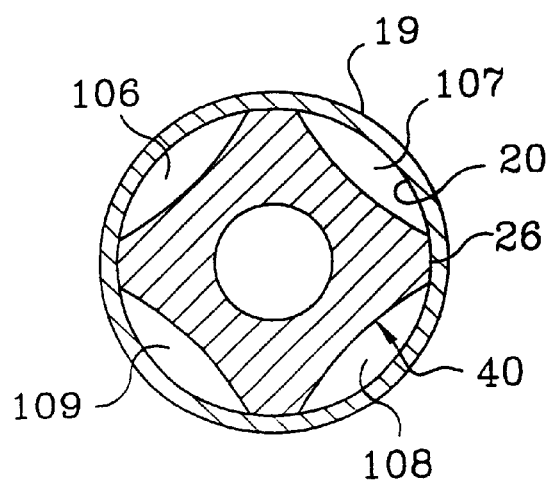
Figure 3C:
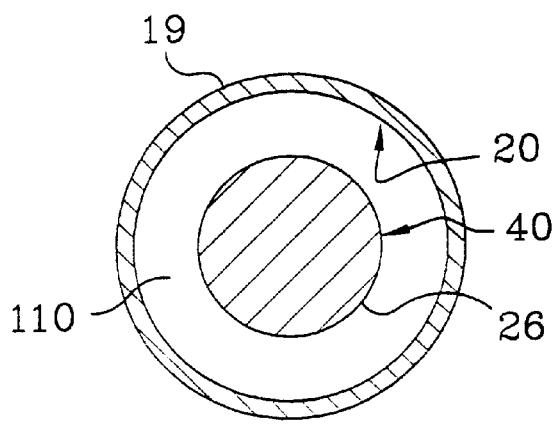

FIGS. 3A–3C illustrate various cross sections of product outlet passages formed by the intermediate part 26 of the closure member 40, opposite the edge 19 defining the opening 20. The embodiment in FIG. 3A is similar to that described with reference to FIG. 2, with six grooves 100–105 made every 60° around the external surface of the intermediate portion 26. In the embodiment of FIG. 3B, the intermediate part has a star-shaped cross section so as to form, between the four arms of the star, four passages 106–109 for the product to pass between the closure member and the edge 19 defining the opening 20. In the embodiment of FIG. 3C, the closure member, unlike in the other embodiments, has the form of a solid "cylinder," the intermediate portion 26 having a circular cross section, concentric with the edge 19 of the opening 20. The cross section of the intermediate portion 26 is smaller than the cross section of the opening 20, so as to form an annular passage 110 around the closure member 40. According to this embodiment, the smaller-diameter intermediate portion 26 may be extended uniformly as far as the piston 21. Typically, the radial width of the annular passage is a few millimeters. Advantageously, in this configuration, the intermediate portion 26 is connected to the portion 23 via a frustoconical region (not shown). Such a region promotes axial flow of the product. In the latter configuration, in which the closure member consists of a solid cylinder, it is necessary only for the portion 23 of the closure member to have a uniform cross section. For this purpose, a cylindrical region of smaller cross section may be formed between the widest end of the frustoconical part and an end part which obstructs the opening 20. This part of smaller cross section makes it possible to reduce the weight of material at this point in the closure member, so as to allow a more satisfactory surface finish, and therefore better sealing to be obtained at closure. The choice of one configuration or another for the product outlet passages depends to a large extent on the viscosity of the product and on the desired flow rate. It is clear that other configurations may be envisaged.

Figure 5:
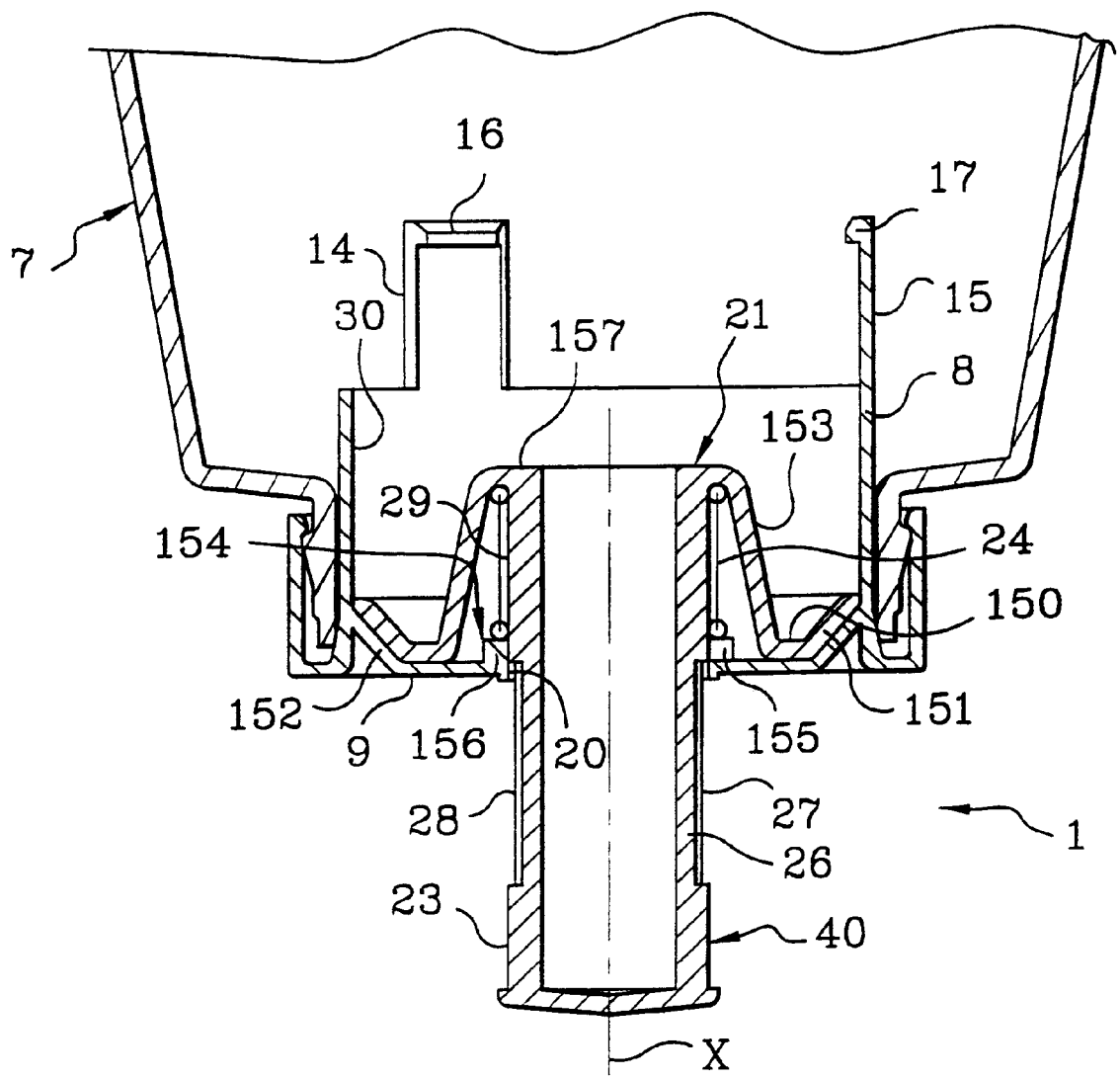
FIG. 5 is a sectional view of an alternative form of the embodiment in FIG. 2.

FIG. 5, to which reference will now be made, illustrates an alternative to the embodiment in FIG. 2. According to this alternative, the piston 21 comprises an annular portion 150 around the closure member 40, which in the low position, bears on the internal surface of the wall 9 of the dosing chamber 30. The outer edge of the annular portion 150 is joined to the peripheral lip of the piston via a first frustoconical portion 151 which flares outwards towards the container. The wall 9 forms, near the region where it joins the side wall 8, a corresponding profile 152 so that, in the low position of the piston 21, the frustoconical part 151 bears on the said portion 152. The inner edge of the annular portion 150 is connected to the central part 157 of the piston 21 by a second frustoconical portion 153. The difference in axial height between the annular part 150 and the central portion 157 corresponds approximately to the height of the spring 24 in the compressed position. The frustoconical portion 153, together with the portion 29 of the closure member 40, define an annular housing capable of containing the spring when the latter is in the compressed position, as shown in FIG. 5. With such a profile of the piston 21, the "residual" volume lying between the piston 21 and the wall 9 of the dosing chamber is substantially reduced, thus allowing the overall size of the head 1 to be reduced. Furthermore, according to this variant, the lower end of the spring is mounted on a crenellated annular surface 154, forming a succession of hollows 155 and of bosses 156. The hollows 155 allow the product to be conveyed towards the passages 27, 28 when the spring is completely compressed. Thus, the extent to which the dosing chamber 30 may be drained is improved.

In the detailed description above, reference was made to preferred embodiments of the invention. It is obvious that alternatives may be made to them, without departing from the scope of the invention as claimed below.

What is claimed is:

1. A dosing head to be mounted on a container containing a product, said dosing head comprising:
   a dosing chamber having a longitudinal axis, and having at least one inlet in fluid communication with an interior of the container;
   a piston, slidably fitted within said dosing chamber, said piston being fitted so as to be able to move from a first position in which said dosing chamber has a maximum volume to a second position in which said dosing chamber has a minimum volume, wherein said at least one inlet is open when said piston is in said first position and said at least one inlet is closed when said piston is in said second position, wherein said piston has a first surface which communicates with the interior of the container, and a second surface which is opposite said first surface and in communication with said dosing chamber, and wherein said first surface is communicated with the interior of the container, when said piston is in said first position, over substantially the entire surface area of the first surface; and
   a closure member coupled to said piston such that when said piston moves from said first position to said second position, said closure member emerges substantially through an opening made in a wall of said dosing chamber, and forms at least one passage between said closure member and an edge of said wall defining said opening, in order to allow expulsion of a dose of the product, said opening being sealed off by said closure member when said piston is in said first position.

2. The dosing head according to claim 1, wherein said closure member includes a portion which substantially closes off said opening when said piston is in the second position.

3. The dosing head according to claim 1, further comprising elastic return means for returning said piston to said first position when the product is not being pressed against said first surface of said piston.

4. The dosing head according to claim 3, wherein said elastic return means comprises a helical spring arranged around said closure member, said helical spring having a first end in abutment with said second surface of said piston and a second end in abutment with a surface of said wall lying opposite said second surface.

5. The dosing head according to claim 4, wherein said second end of said helical spring is in abutment with an element defining at least one recessed portion so as to allow the product to flow under said helical spring when said piston is in said second position.

6. The dosing head according to claim 1, wherein a profile of said piston is such that, when said piston is in said second position, an annular region of said piston is substantially in contact with said wall.

7. The dosing head according to claim 1, wherein the container comprises deformable side walls, the product being made to press against said first surface of said piston by pressure being exerted on said side walls, and wherein said dosing head further comprises means for allowing air to enter the container when the pressure on said side walls ceases, so as to compensate for a reduction in volume of the product inside the container after a dose of the product has been dispensed.

8. The dosing head according to claim 7, wherein said means for allowing air intake is configured to allow air intake to occur while said piston is returning to said first position, via said at least one passage.

9. The dosing head according to claim 1, wherein said at least one inlet extends over an axial height such that, over a first part of a travel of said piston between said first and second positions, said at least one inlet is open so as to allow pressurized product to enter said dosing chamber, in order to allow substantially complete filling of said dosing chamber, said closure member configured such that said opening in said dosing chamber is closed off when said piston moves over said first part of said travel of said piston.

10. The dosing head according to claim 9, wherein said closure member comprises a first portion adjacent to said piston and a second portion opposite said first portion, said second portion of said closure member having approximately a same height as said axial height of said at least one inlet and a cylindrical cross section capable of closing off said opening over said first part of said travel of said piston.

11. The dosing head according to claim 10, wherein said at least one passage between said closure member and said edge of said wall defining said opening is formed by at least one axial region of said closure member, said at least one axial region having a smaller cross section than a cross section of said opening and lying in an intermediate portion located between said first portion and said second portion of said closure member.

12. The dosing head according to claim 11, wherein said at least one passage has a radial depth of from 0.01 mm to 8 mm.

13. The dosing head according to claim 11, wherein said at least one passage has a radial depth of from 0.2 mm to 2 mm.

14. The dosing head according to claim 11, wherein said intermediate portion has a smaller cross section than said cross section of said opening and lies along said axis of said opening so as to allow the product to pass around said closure member.

15. The dosing head according to claim 1, wherein said dosing chamber is arranged annularly around said closure member, said closure member being centered on said central longitudinal axis of said dosing chamber.

16. The dosing head according to claim 1, further comprising means for fixing said dosing head onto a neck included on the container, by at least one of snap-fastening and screwing.

17. The dosing head according to claim 1, wherein said dosing head is formed by molding at least one of polypropylene and polyethylene.

18. An assembly for packaging and dispensing a dose of a product, especially a cosmetic product, said assembly comprising:
a container having a body with a first end closed by a bottom and a second end forming a neck having a free edge which defines an opening; and
a dosing head being fixedly fitted into said neck, said dosing head comprising:
a dosing chamber having a longitudinal axis, and having at least one inlet in fluid communication with an interior of the container;
a piston, slidably fitted within said dosing chamber, said piston being fitted so as to be able to move from a first position in which said dosing chamber has a maximum volume to a second position in which said dosing chamber has a minimum volume, wherein said at least one inlet is open when said piston is in said first position and said at least one inlet is closed when said piston is in said second position, wherein said piston has a first surface which communicates with the interior of the container, and a second surface which is opposite said first surface and in communication with said dosing chamber, and wherein said first surface is communicated with the interior of the container over substantially the entire surface area of said first surface; and
a closure member coupled to said piston such that when said piston moves from said first position to said second position, said closure member emerges substantially through an opening made in a wall of said dosing chamber, and forms at least one passage between said closure member and an edge of said wall defining said opening, in order to allow expulsion of the dose of the product, said opening being sealed off by said closure member when said piston is in said first position.

19. The assembly according to claim 18, wherein said body comprises walls capable of deforming when pressure is exerted thereon, and capable of returning to an initial position when the pressure ceases.

20. The assembly according to claim 18, further comprising a cap configured to removably cover said dosing head.

21. An assembly for packaging and dispensing a dose of a product, especially a cosmetic product, said assembly comprising:
a container having a body containing a liquid product, with a first end of the body closed by a bottom and a second end forming a neck having a free edge which defines an opening; and
a dosing head being fixedly fitted into said neck, said dosing head comprising:
a dosing chamber having a longitudinal axis and having at least one inlet in fluid communication with an interior of the container;
a piston, slidably fitted within said dosing chamber, said piston having a first surface arranged to be in permanent fluid communication with the liquid product in the interior of the container, said piston having a second surface which is opposite said first surface and in communication with said dosing chamber, said piston being fitted so as to be able to, in response to pressure exerted by the product on said first surface, move from a first position in which said dosing chamber has a maximum volume to a second position in which said dosing chamber has a minimum volume, wherein said at least one inlet is open when said piston is in said first position and wherein said at least one inlet is closed when said piston is in said second position; and
a closure member coupled to said piston such that when said piston moves from said first position to said second position, said closure member emerges substantially through an opening made in a wall of said dosing chamber, and forms at least one passage between said closure member and an edge of said wall defining said opening, in order to allow expulsion of a dose of the product, said opening being sealed off by said closure member when said piston is in said first position.

22. An assembly for packaging and dispensing a dose of a product, especially a cosmetic product, said assembly comprising:
a container having a body with a first end closed by a bottom and a second end forming a neck having a free edge which defines an opening; and
a dosing head being fixedly fitted into said neck, said dosing head comprising:
a dosing chamber defined by a non-movable side wall, having a longitudinal axis, and having at least one inlet in fluid communication with an interior of the container;
a piston, slidably fitted within said dosing chamber, said piston having a first surface arranged to communicate with the interior of the container, said piston having a second surface which is opposite said first surface and in communication with said dosing chamber, said piston being fitted so as to be able to, in response to pressure exerted by the product on said first surface, move from a first position in which said dosing chamber has a maximum volume to a second position in which said dosing chamber has a minimum volume, wherein said at least one inlet is open when said piston is in said first position and wherein said at least one inlet is closed when said piston is in said second position;

a closure member coupled to said piston such that when said piston moves from said first position to said second position, said closure member emerges substantially through an opening made in a wall of said dosing chamber, and forms at least one passage between said closure member and an edge of said wall defining said opening, in order to allow expulsion of a dose of the product, said opening being sealed off by said closure member when said piston is in said first position; and an elastic return member structurally configured to return said piston to said first position when the product is not being pressed against said first surface of said piston.

* * * * *